United States Patent
Mihira

(10) Patent No.: US 8,553,292 B2
(45) Date of Patent: Oct. 8, 2013

(54) IMAGE PROCESSING SYSTEM AND CONTROL METHOD THEREOF

(75) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 12/707,725

(22) Filed: Feb. 18, 2010

(65) Prior Publication Data
US 2010/0231982 A1   Sep. 16, 2010

(30) Foreign Application Priority Data

Mar. 12, 2009   (JP) .................................. 2009-060114

(51) Int. Cl.
*H04N 1/00* (2006.01)

(52) U.S. Cl.
USPC .......... 358/402; 358/1.15; 358/408; 358/442; 358/450; 358/474

(58) Field of Classification Search
USPC ................ 358/402, 407, 408, 442, 474, 1.15, 358/448, 450, 452
See application file for complete search history.

(56) References Cited

U.S. PATENT DOCUMENTS

| | | | | |
|---|---|---|---|---|
| 6,122,684 A * | 9/2000 | Sakura | ............................. | 710/73 |
| 6,883,046 B2 * | 4/2005 | Shih et al. | ........................ | 710/62 |
| 7,068,399 B2 * | 6/2006 | Wiechers et al. | .............. | 358/474 |
| 7,095,512 B1 * | 8/2006 | Yoda et al. | .................... | 358/1.13 |
| 7,184,169 B2 | 2/2007 | Kropf et al. | ................... | 358/1.18 |
| 7,420,695 B2 * | 9/2008 | Kawabata et al. | ............ | 358/1.15 |
| 8,355,147 B2 * | 1/2013 | Ferlitsch | ....................... | 358/1.15 |
| 2002/0135818 A1 * | 9/2002 | Wiechers et al. | .............. | 358/474 |
| 2002/0140968 A1 | 10/2002 | Kawabata et al. | ............ | 358/1.15 |
| 2004/0032624 A1 * | 2/2004 | Stevens et al. | ................ | 358/402 |
| 2004/0252330 A1 | 12/2004 | Brown et al. | ................. | 358/1.15 |
| 2006/0109498 A1 * | 5/2006 | Ferlitsch | ....................... | 358/1.15 |
| 2007/0019750 A1 | 1/2007 | Gaikwad et al. | ............... | 375/260 |
| 2008/0192289 A1 | 8/2008 | Honda et al. | ................. | 358/1.15 |
| 2010/0074149 A1 * | 3/2010 | Terada et al. | ................. | 370/260 |
| 2010/0231961 A1 | 9/2010 | Fukushima | ................... | 358/1.15 |

FOREIGN PATENT DOCUMENTS

| | | |
|---|---|---|
| JP | 2000-224369 | 8/2000 |
| JP | 2002-033879 | 1/2002 |
| JP | 2002-290660 | 10/2002 |
| JP | 2004-120340 | 4/2004 |
| JP | 2004-318432 | 11/2004 |
| JP | 2005-176191 | 6/2005 |
| JP | 2006-217212 | 8/2006 |
| JP | 2007-019750 | 1/2007 |
| JP | 2007-110421 | 4/2007 |

* cited by examiner

*Primary Examiner* — Kimberly A Williams
(74) *Attorney, Agent, or Firm* — Fitzpatrick, Cella, Harper & Scinto

(57) ABSTRACT

An image processing system comprises a first image reading apparatus which generates first image data by reading an image, transmits the first image data to a transmission destination via a network, and transmits, to a second image reading apparatus, information for combining image data which is transmitted by each of the first image reading apparatus and the second image reading apparatus to the transmission destination, the second image reading apparatus which generates second image data by reading an image, and transmits the second image data to the transmission destination via the network by using the transmitted information.

18 Claims, 17 Drawing Sheets

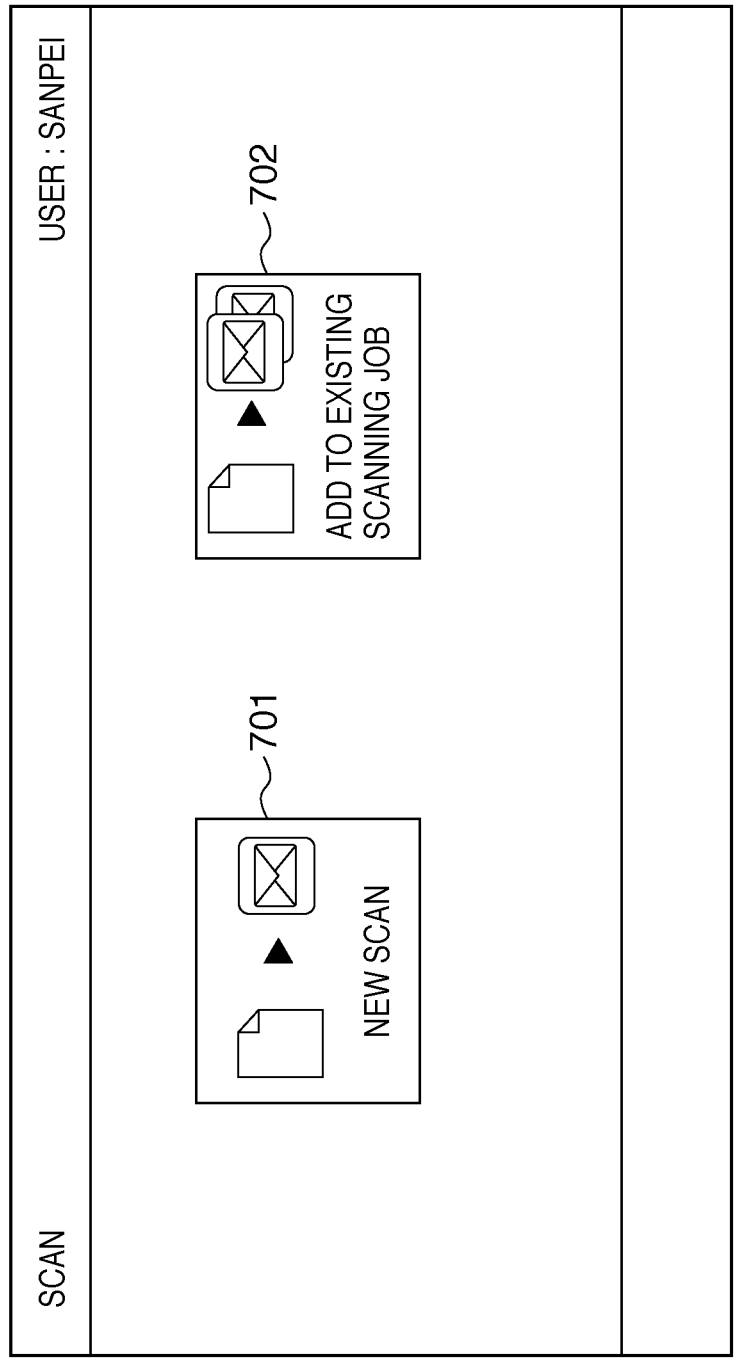

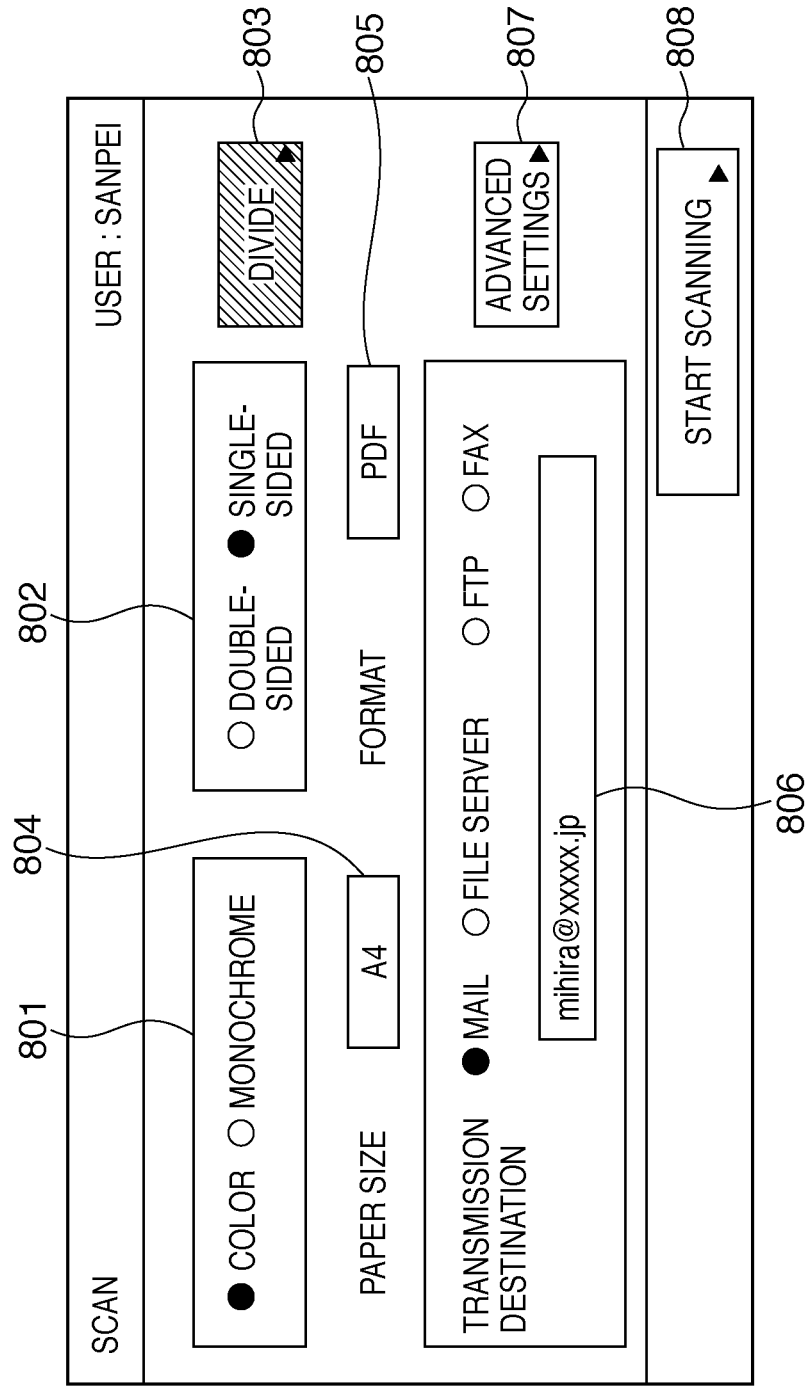

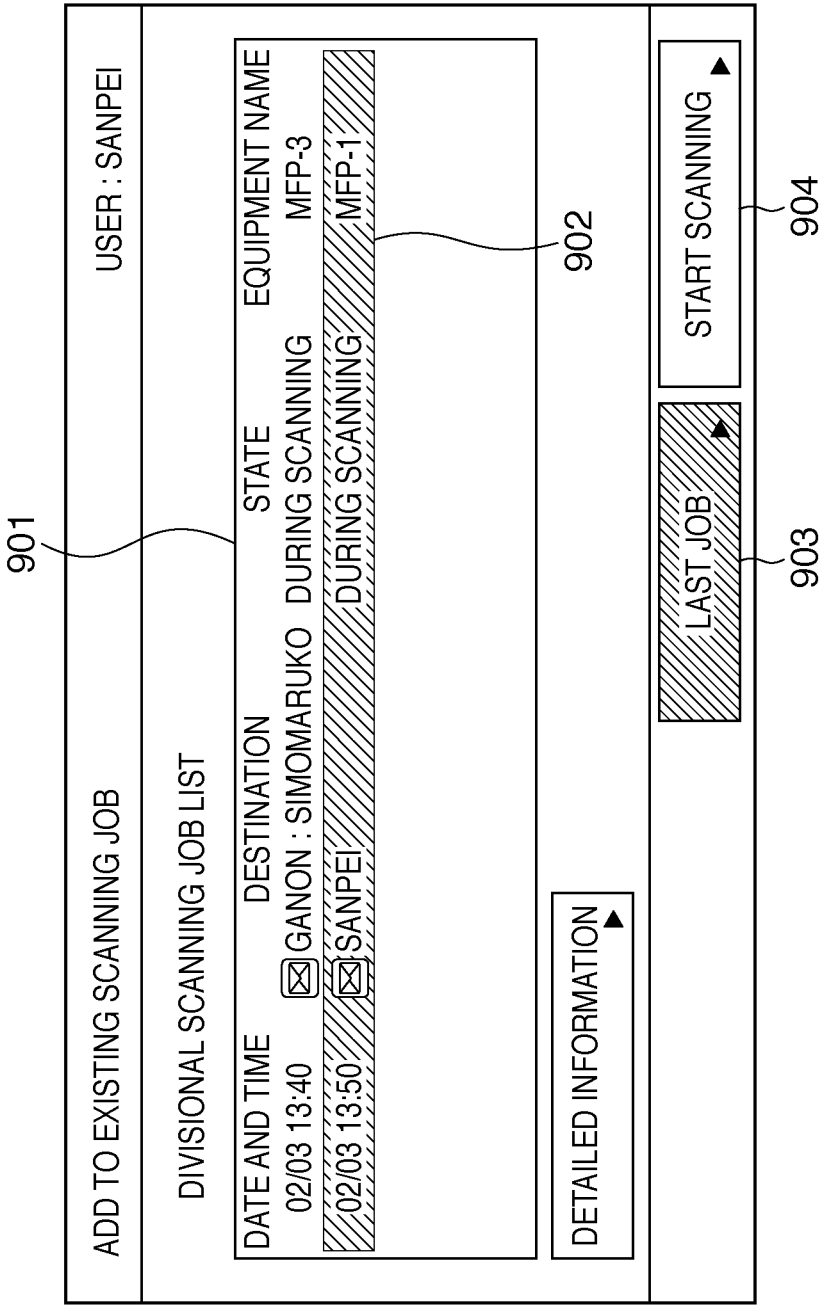

FIG. 8B

```
MAIL READER                                    _ □ ×

FILE(E)  EDIT(E)  DISPLAY(V)  MAIL(M)  TOOL(T)  HELP(H)

DATE AND TIME   SENDER              SUBJECT
02/02 15:30     GENERAL AFFAIRS     ABOUT MEETING ROOM        ─1011
                DEPARTMENT          RESERVATION SYSTEM
////02/03 13:55////                 SCAN-1//////////
////02/03 14:01////                 SCAN-2//////////          ─1012
                                          ┌─────────────────┐ ─1013
                                          │ DIVIDED MAIL DATA│
                                          │ ARE COMBINED     │
                                          └─────────────────┘
```

JvM8t8e0rY08l8VO1Urmz+P2p/x1eN8L3Ga5WnPZHx/8K7rm+6+sl9D+U84td5VhccovG5wUQdCN+
HAU0RVLY9FqqBVmGWKkipVl9BdjXHojmDnelfTOVN0xE3HYIrGjUGiw2JY6Vok17rIVPIMWs8x66
Mm2Y7mO++k9EQn+dgG7RZJ5DxYjUB/yl2kXJglKTTD3l0Oo2oVvBmh9LJs79ZOD/h3GeGu2+8Otv
oeEQ6t1rVploDVPDjzTWG6DWu5fzv+j3jR9EXPejlCyFl3bJyu+YKSYVZMlEuxdXp/FB6z/P9WR6
RcfuTcoHtmAvMPHMA7PAGNVze96p3vZlGuklhvmvVjsbO1PQEQr8Ub6ku05f9xYzrfcWf1uK+8gY
P64GGazMrGR5TjJFrlFDDllKHBJEwTNZ2GAJQydJGxseWzDYl8fVpdbpzMt9I4HiqEbpmvoXur4E
8nMtJ0xjJ2YZqQkwY9c8K8e9IzA98FQByAQDSwAW3jA9F/k+Q+o9U+oX490YQaRS1GMTtOw2bRVb
+Y523/X6N8lOzkj5F+hcL5LlCErPZ6xX6fttBXo1Fosl3h7Mk+PauKSlOvYkm9KSf0t+ll0eFGZT
Qjw837qHwg5F1zIPghyo4sBxbiunaHXeK+WGaHRhcDk8eNLyjxvSPfO6blBfGAckOJKaneh+E4j
8/zmu10Dq3rH/l68KA4kPvrfLcLQAc4w/Ub4fmhv2yblbA3WYaUPwexebDXNI2264oYA+m9UPua3
V5VsOufdNIXHUsm4wH7/1dRZcwGa9Y4Lqh5N355ZzT/+AgL4Q3TWkeRxrCAMcksYPhvbe6hDZNVQ
xBzSknTJ4qiT2HpvZdh7fRrah0PHe/14bMP5B4LtQ9+FIbEMAPv+yJvBHlPzXBaG9Y6pkHqCl/B
oDhoADJRpHCHtEDKapgOtQ5V/3QmPk34dPyqHtA/w6EN7GzBkGWUyczrbKy64fziZOoOgjkvekk

| MAIL READER | | | | | |
|---|---|---|---|---|---|
| FILE(F) | EDIT(E) | DISPLAY(V) | MAIL(M) | TOOL(T) | HELP(H) |

| DATE AND TIME | SENDER | SUBJECT |
|---|---|---|
| 02/02 15:30 | GENERAL AFFAIRS DEPARTMENT | ABOUT MEETING ROOM RESERVATION SYSTEM |
| 02/03 13:55 | MFP-1 | SCAN-1 ~1111 |

ATTACHED FILE   PDF  SCAN-20080203.PDF ~1112

FIG. 9B

MAIL READER

FILE(F)  EDIT(E)  DISPLAY(V)  MAIL(M)  TOOL(T)  HELP(H)

| DATE AND TIME | SENDER | SUBJECT |
|---|---|---|
| 02/02 15:30 | GENERAL AFFAIRS DEPARTMENT | ABOUT MEETING ROOM RESERVATION SYSTEM |
| 02/03 13:55 | MFP-1 | SCAN-1-1 — 1201 |
| 02/03 13:55 | MFP-1 | SCAN-1-2 — 1202 |
| 02/03 14:01 | MFP-2 | SCAN-2-1 — 1203 |
| 02/03 14:01 | MFP-2 | SCAN-2-2 — 1204 |

JvM8t8e0rY08I8VO1Urmz+P2p/x1eN8L3Ga5WnPZHx/8K7rm+6+sl9D+U84fd5VhcovG5wUQdCN+
HAU0RVLY9FqqBVmGWKkipVI9BdjXHojmDnelfTOVN0xE3HYIrGjUGiw2JY6Vok17rIVPIMWs8x66
Mm2Y7mO++k9EQn+dgG7RZJ5DxYjUB/yl2kXJgLkTTD3I0Oo2oVvBmh9LJs79ZOD/h3GeGu2+8Ofv
oeEQ6t1rVploDVPDjzTWG6DWu5fzv+j3jR9EXPejICyFI3bJyu+YKSYVZMIEuxdXp/FB6z/P9WR6
RcfuTcoHtmAvMPHMA7PAGNVze96p3vZlGuklhvmvVjsbO1PQEQr8Ub6ku05f9xYzrfcWf1uK+8gY
P64GGazMrGR5TjJFrIFDDllkHBJEwTNZ2GAJQydJGxseWzDYl8fVpdbpzMt9I4HiqEbpmvoXur4E
8nMtJ0xjJ2YZqQkwY9c8K8e9lzA98FQByAQDSwAW3jA9F/k+Q+o9U+oX490YQaRS1GMTtOw2bRVb
+Y523/X6N8IOzkj5F+hcL5LICErPZ6xX6fittBXo1Fosl3h7Mk+PauKSIOvYkm9KSf0t+II0eFGZT
Qjw837qHwg5F1zIPghyot4sBxbiunaHXeK+WGaHRhcDk8eNLyjxvSPfO6bIBfGAckOJKAneh+E4j
8/zmu10dDq3rH/I68KA4kPvfLcQLAc4w/Ub4fmhv2yblbA3WYaUPwexebDXNI2264oYA+m9UPua3
V5VsOufdNlXHUsm4wH7/1dRZcwGa9Y4Lqh5N355ZzT/+AgL4Q3TWkeRxrCAMcksYPhvbe6hDZNVQ
xBzSknTJ4qiT2HpvZdh7fRrah0PHe/14bMP5B4LtQ9+FlbEMAPv+yJvBHIPzXBaG9Y6pkHqCl/B
oDhoADjRpHCHtEDKapgOtQ5V/3QmPk34dPygHtA/w6EN7GzBkGWUyczrbKy64fzilZOoOgjk/eKk

IMAGE PROCESSING SYSTEM AND CONTROL METHOD THEREOF

BACKGROUND OF THE INVENTION

1. Field of the Invention

The present invention relates to an image processing system which reads and processes a plurality of originals by distributing them to a plurality of image reading apparatuses connected to each other via a network, and a control method of the system.

2. Description of the Related Art

The trend of digitization of paper documents and paperless trend using image reading apparatuses (scanners) have been growing in offices and homes. An increase in storage capacity that can store image data and the like seems to be one of the causes of such trends. There will be an increasing tendency toward reading large quantities of originals. It takes too much time for one scanner to read large quantities of originals. It is therefore conceivable to quicken the processing of reading these originals by distributing the original read processing to a plurality of scanners and concurrently performing the processing.

In such a conventional distributed/concurrent scanning method, image data read by different image reading apparatuses are temporarily collected in one of the image reading apparatuses or a server. This image reading apparatus or server then combines the data into one file and transmits it to a designated transmission destination (see Japanese Patent Laid-Open No. 2002-033879 (FIG. 10) and Japanese Patent Laid-Open No. 2005-176191).

According to the above conventional technique, however, one image reading apparatus or server collects image data, combines the data into one file, and then transmits the combined file to a transmission destination. This increases the load on the network.

SUMMARY OF THE INVENTION

A characteristic feature of the present invention is that when large quantities of originals are to be read, the read processing is distributed to a plurality of image reading apparatuses, and the image data read by the respective image reading apparatuses are transmitted to a transmission destination and combined, thereby reducing the network load and read processing load.

In order to solve the aforementioned problems, the present invention provides an image processing system comprising: a first image reading apparatus of a plurality of image reading apparatuses including a first image reading unit configured to generate first image data by reading an image, a first transmission unit configured to transmit the first image data to a transmission destination via a network, and an information transmission unit configured to transmit, to a second image reading apparatus of the plurality of image reading apparatuses, information for combining the image data which is transmitted by each of the first image reading apparatus and the second image reading apparatus to the transmission destination, the second image reading apparatus including a second image reading unit configured to generate second image data by reading an image, and a second transmission unit configured to transmit the second image data to the transmission destination via the network by using the information transmitted by the information transmission unit.

The present invention also provides a control method of a plurality of image reading apparatuses, the method comprising: a first image reading step of causing a first image reading apparatus of the plurality of image reading apparatuses to generate first image data by reading an image; a first transmission step of causing the first image reading apparatus to transmit the first image data to a transmission destination via a network; a step of causing the first image reading apparatus to transmit, to a second image reading apparatus of the plurality of image reading apparatuses, information for combining image data which is transmitted by each of the first image reading apparatus and second image reading apparatus to the transmission destination; a second image reading step of causing the second image reading apparatus to generate second image data by reading an image; and a second transmission step of causing the second image reading apparatus to transmit the second image data to the transmission destination via the network by using the transmitted information.

The present invention also provides an image reading apparatus comprising: a reception unit configured to receive, from another image reading apparatus which generates first image data by reading and image and transmits the first image data to a transmission destination, information for combining image data which is transmitted by each of the image reading apparatus and the other image reading apparatus to the transmission destination; a second image reading unit configured to generate second image data by reading an image; and a second transmission unit configured to transmit the second image data to the transmission destination via the network by using the information received by the reception unit.

According to the present invention, the loads on the network and image reading apparatus can be reduced, and the large quantities of originals can easily be read and combined at the transmission destination.

Further features of the present invention will become apparent from the following description of exemplary embodiments (with reference to the attached drawings).

BRIEF DESCRIPTION OF THE DRAWINGS

FIG. 7A is a view showing an example of a UI screen displayed in step S401 in FIG. 4;

FIG. 7B is a view showing an example of a UI screen displayed by a new scan button in FIG. 7A;

FIG. 8A is a view showing an example of a UI screen displayed on the display unit of an operation unit after an addition button for an existing scanning job is pressed on the UI screen in FIG. 7B;

FIG. 8B is a view showing an example of a screen on the display unit of a PC client in the first embodiment;

FIG. 9A is a view showing an example of display of a transmission document combined by a PC client;

FIG. 9B is a view showing an example of display of a screen when a PC client divides each transmission document such that the size of the resultant transmission document falls within a specified value;

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied.

The present invention should not be limited to the following embodiments.

First Embodiment

Figure 1:
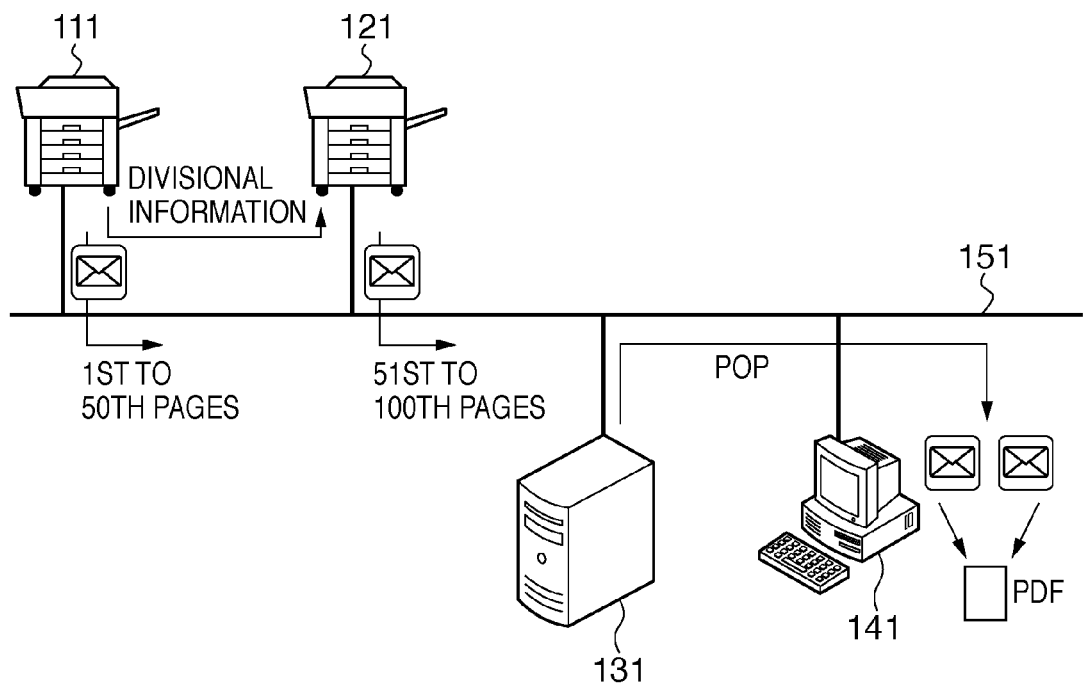
FIG. 1 is a view showing the arrangement of an image processing system according to the first embodiment of the present invention.

FIG. 1 is a view showing the arrangement of an image processing system according to the first embodiment of the present invention.

Image reading apparatuses 111 and 121 each includes a scanner unit 213 (FIG. 2) and can read original images. These apparatuses can also perform divisional scanning and electronic mail transmission in accordance with instructions from the user. A mail server 131 receives and holds the electronic mail transmitted from the image reading apparatus 111 or 121. The mail server 131 also has a function of transferring held mail to a PC client 141 upon mail reading operation based on POP or the like from the PC client 141. The image reading apparatuses 111 and 121, the mail server 131, and the PC client 141 are connected to each other via a network 151. The network 151 is a network which implements LAN connection such as ETHERNET®.

The following will exemplify a case in which a total of 100 pages of an original are divided into two groups each including 50 pages, and the image reading apparatuses 111 and 121 divisionally read the respective groups of pages. The image reading apparatus 111 reads the first to 50th pages of the original. The image reading apparatus 121 reads the second group including the 51st to 100th pages. Assume that the image data read by the image reading apparatus 111 is the first image data, and the image data read by the image reading apparatus 121 is the second image data.

Figure 2:
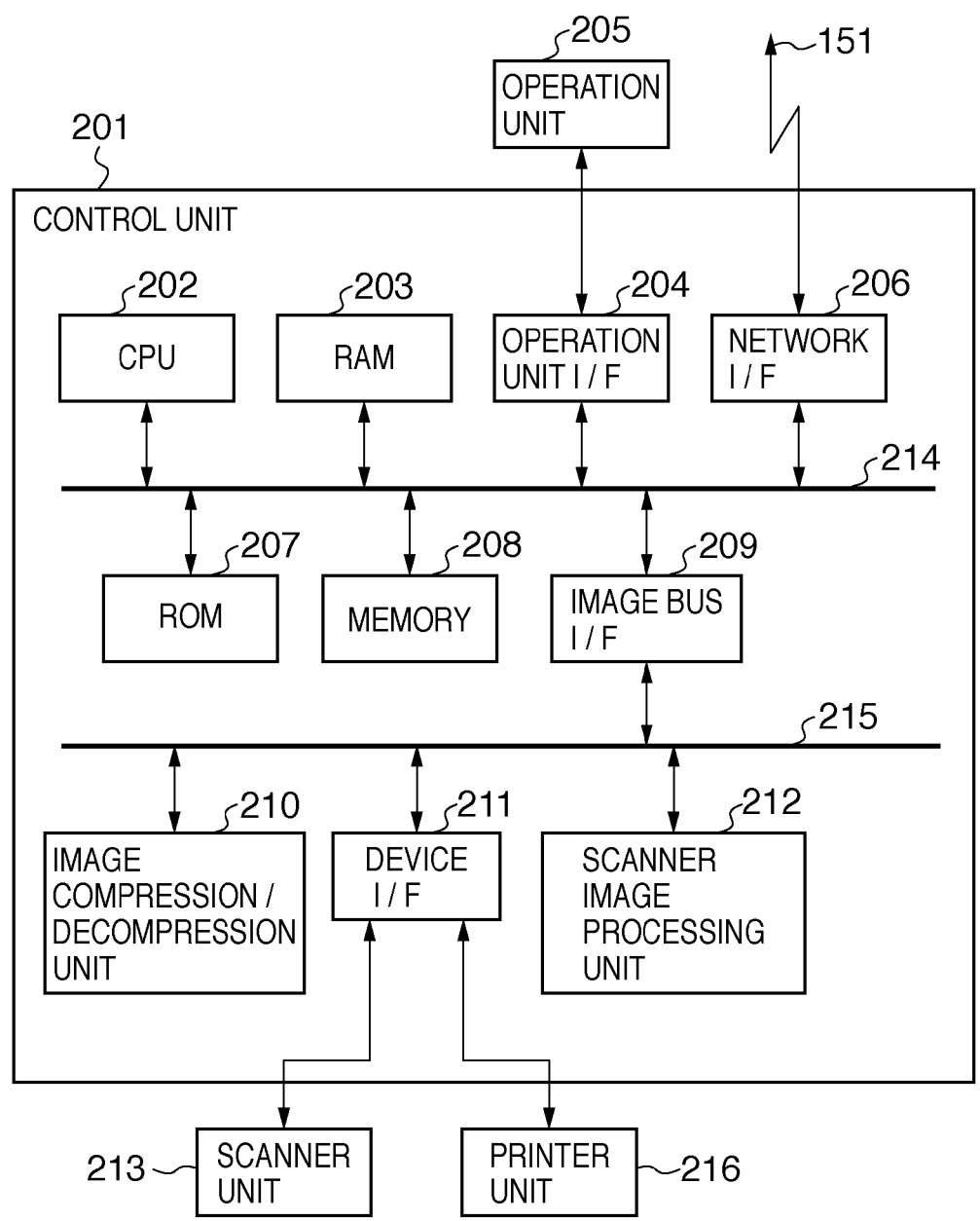
FIG. 2 is a block diagram showing the arrangement of an image reading apparatus according to this embodiment.

FIG. 2 is a block diagram showing the hardware arrangement of the image reading apparatus 111 (121) according to the first embodiment. Note that since the image reading apparatuses 111 and 121 have the same arrangement, the following will exemplify the case of the image reading apparatus 111. The first embodiment will exemplify a case in which the image reading apparatuses 111 and 121 each are a multi function peripheral (MFP) having FAX, copy, printing, and storage functions.

A control unit 201 controls the overall operation of the image reading apparatus 111. The control unit 201 is connected to the scanner unit 213 as an image input device which reads an original such as a document and inputs the original image data. The control unit 201 is also connected to the network 151 via a network interface 206, and communicates with other equipment via the network 151. A CPU 202 controls the image reading apparatus 111 in accordance with control programs loaded into a RAM 203. A program for the operation of the CPU 202 is loaded from a memory 208 into the RAM 203. The RAM 203 also provides a work area for temporarily storing image data or various kinds of data when the CPU 202 operates. A ROM 207 is a boot ROM, and stores a boot program for the image reading apparatus 111. The memory 208 is, for example, a hard disk drive (HDD), in which system software, an OS, and application software which are executed by the CPU 202 are installed. The memory 208 stores the image data read by the scanner unit 213.

An operation unit interface 204 is an interface unit with an operation unit 205, and has a function of outputting, to the operation unit 205, image data to be displayed on the operation unit 205 and transmitting, to the CPU 202, information input by the user using the operation unit 205. The network interface 206 is connected to the network 151 to input and output information. The above units are connected to the CPU 202 via a system bus 214. Note that the operation unit 205 includes a touch panel, and is configured to display information and accept inputs from the user.

An image bus interface 209 is a bus bridge which converts a data structure, and is connected to the system bus 214 and an image bus 215 which transfers image data at high speed. The image bus 215 includes a PCI bus or IEEE1394. An image compression/decompression (CODEC) 210, a device interface 211, and a scanner image processing unit 212 are connected to the image bus 215. The image compression/decompression unit 210 converts multi-value image data into JPEG data, or executes compression/decompression processing such as JBIG, MMR, or MH for binary image data. The device interface 211 connects the control unit 201, the scanner unit 213, and a printer unit 216 to each other. The scanner image processing unit 212 corrects, processes, and edits the image data input from the scanner unit 213.

Figure 3:
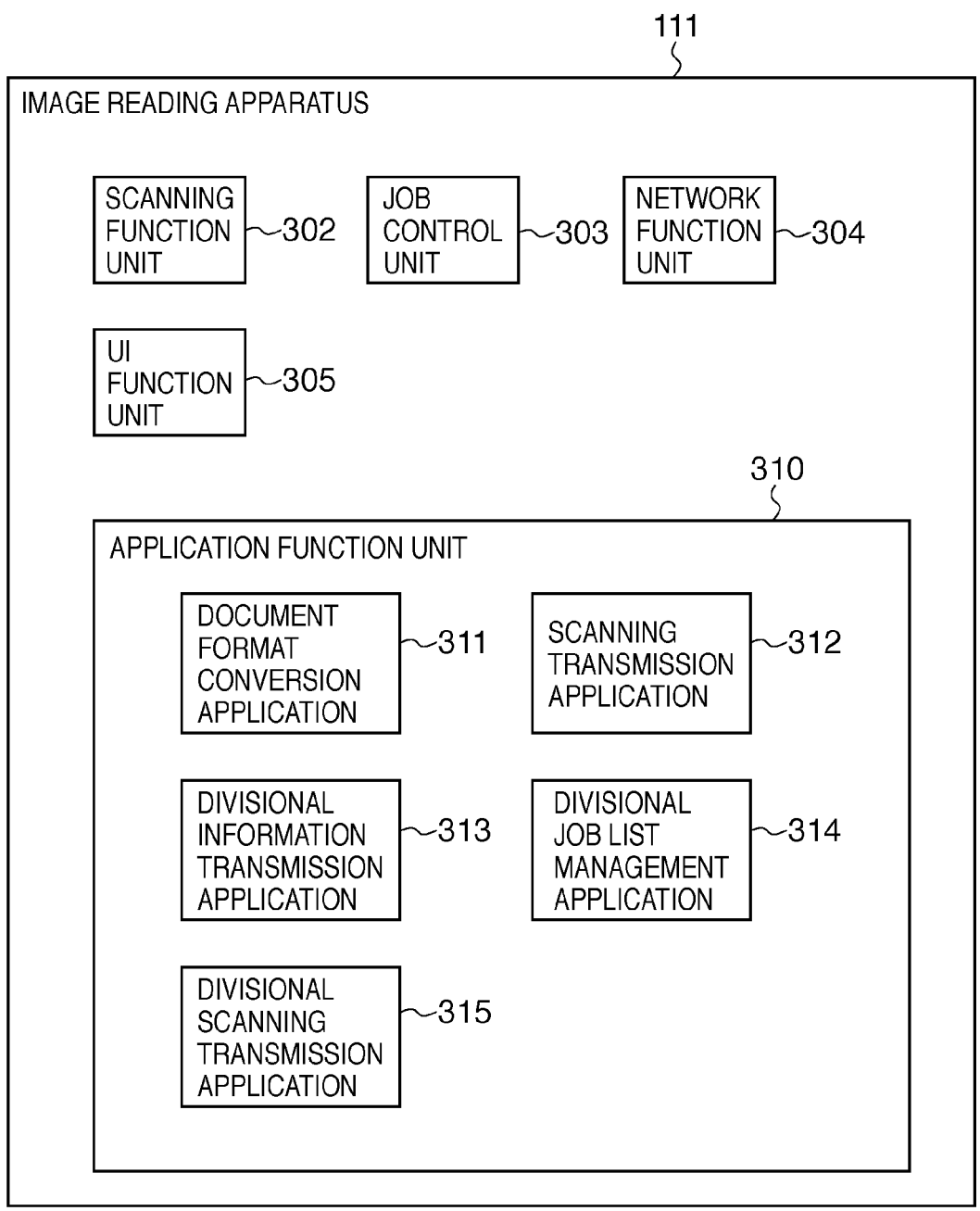
FIG. 3 is a functional block diagram for explaining the software functions of the image reading apparatus.

FIG. 3 is a functional block diagram for explaining the software functions of the image reading apparatus according to the first embodiment. In this case as well, since the image reading apparatuses 111 and 121 have the same software arrangement, the following will exemplify the case of the image reading apparatus 111.

A scanning function unit 302 executes a function of reading an original by using the scanner unit 213, reads an original as a paper document, and converts the read data into binary or multi-value image data. A job control unit 303 queues image data received from the scanning function unit 302 as scanning jobs, and outputs them to a network function unit 304 (to be described later). The network function unit 304 has various network protocol (electronic mail protocol) functions such as TCP/IP, HTTP, FTP, LDAP, SNMP, SMTP, and SSL, and communicates with other apparatuses via the network 151. A UI function unit 305 controls a user interface (UI), and manages input/output processing performed by the user using the operation unit 205 of the image reading apparatus 111. In addition, the UI function unit 305 displays an input field, an output message field, and the like on the display panel of the operation unit 205, accepts an input for the input field from the user, and notifies another functional unit of the input. The UI function unit 305 also displays a message for the user from another functional unit on a pre-designed screen.

An application function unit 310 executed by an application program will be described next.

The application function unit 310 has a function of installing various kinds of applications running on the image reading apparatus 111, executing the applications, and uninstalling them. A document format conversion application 311 converts the electronic data (image data) read by the scanning function unit 302 into a preset electronic data format in accordance with an instruction input by the user with the operation unit 205. A scanning transmission application 312 transmits to a preset transmission destination electronic mail to which the electronic data read by the scanning function unit 302 is attached. In addition, when executing divisional scanning in accordance with user designation, the scanning transmission application 312 executes divisional transmission in cooperation with a divisional information transmission application 313 and divisional job list management application 314 (to be described later). The divisional information transmission application 313 has a function of cooperating with an image reading apparatus which is executing another divisional scanning operation, when performing divisional transmission using the scanning transmission application 312. When the scanning transmission application 312 is performing transmission by divisional scanning, the divisional job list management application 314 holds the information of a divisional scanning job during or after execution. In addition, the divisional job list management application 314 transmits a held divisional job list in response to a preceding job list obtaining request from another image reading apparatus 121 or the like. A divisional scanning transmission application 315 has a function of cooperating with second and subsequent scanning operation for two or more original bundles at the time of divisional scanning. The divisional scanning transmission application 315 then executes divisional scanning in cooperation with the divisional information transmission application 313 executed on the image reading apparatus 111.

Divisional scanning according to the first embodiment of the present invention will be described next.

Figure 4:
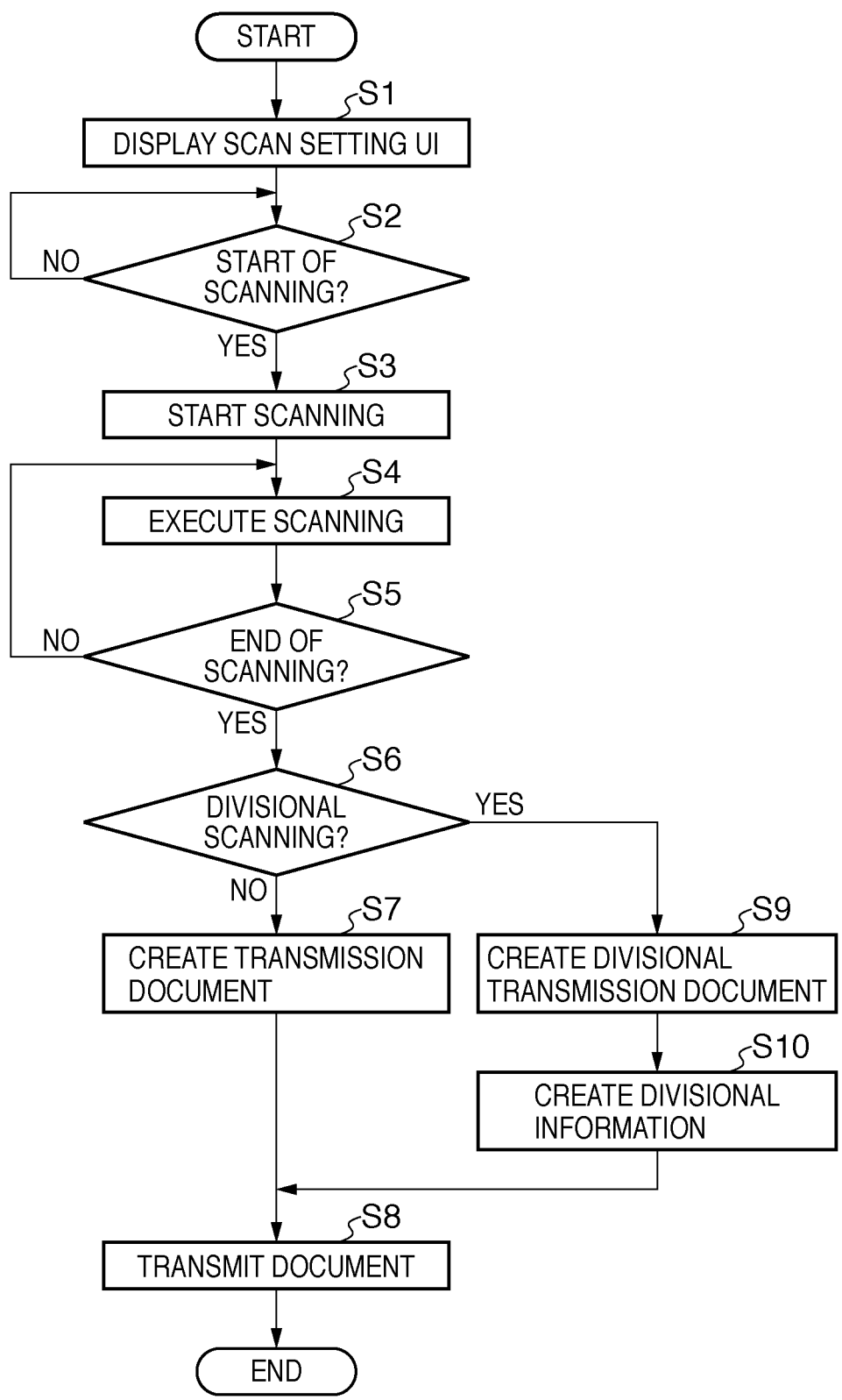
FIG. 4 is a flowchart showing the divisional scanning processing performed by each image reading apparatus according to the first embodiment.

FIG. 4 is a flowchart for explaining the processing to be performed when each image reading apparatus according to the first embodiment executes divisional scanning. Note that a program which executes this processing is loaded from the memory 208 into the RAM 203 at the time of execution, and is executed under the control of the CPU 202. This processing corresponds to the processing executed by the image reading apparatus 111 according to the first embodiment.

First of all, in step S1, the CPU 202 displays UI screens like those shown in FIGS. 7A and 7B on the display panel of the operation unit 205, and receives instructions input by using the UI screens via the operation unit interface 204.

FIG. 7A is a view showing an example of a UI screen displayed on the operation unit 205 in step S1 in FIG. 4.

A new scan button 701 is a button for issuing an instruction to start a scanning job. This button is also used to issue an instruction to perform the first job in divisional scanning (reading operation from the first page of the first original bundle (first bundle)). In the first embodiment, for example, the button is selected on the image reading apparatus 111 which reads the first original bundle.

A button 702 is used to issue an instruction to add a job to an existing scanning job. That is, this button issues an instruction to execute the remaining job in divisional scanning (e.g., reading operation from the 51st page to the 100th page of the second original bundle (second bundle)). In the first embodiment, for example, the button is selected on the image reading apparatus 121.

FIG. 7B is a view showing an example of a UI screen displayed on the operation unit 205 when the new scan button 701 is pressed in FIG. 7A.

Setting buttons 801, 802, 803, 804, and 805 are buttons for scanning/reading settings. The color/monochrome button 801 is a button for designating whether to read an original in color or monochrome. The double-sided/single-sided scan button 802 is a button for designating whether to read a double-sided original or a single-sided original. The division designation button 803 is used to issue an instruction to perform divisional scanning by using a plurality of image reading apparatuses. The first embodiment exemplifies a state in which the division designation button 803 is pressed on the image reading apparatus 111 to perform divisional scanning by using the image reading apparatuses 111 and 121. The paper size button 804 is a button for designating a paper size for an original subjected to be read. The format designation button 805 is a button for designating a format for the electronic data of a read original image. Referring to FIG. 7B, the PDF format is designated. A transmission destination setting button 806 is used to designate a transmission destination. In this case, this button allows designating one of transmission by electronic mail (mail), transmission to the file server (file server), and transmission by FTP (FTP), and facsimile transmission (FAX). In the case shown in FIG. 7B, electronic mail is selected, and the mail address of the transmission destination is input. A detailed setting button 807 is a button for making detailed settings for scanning, for example, high compression setting associated with a storage format. A scan start button 808 is a button for issuing an instruction to start reading by the scanner unit 213.

When the user performs input operation in accordance with the display of screens shown in FIGS. 7A and 7B and presses the scan start button 808 in step S2, the process advances to step S3. In step S3, the control unit 201 causes the scanning function unit 302 to start read processing by using the scanner unit 213. The process then advances to step S4 to receive the image data read by the scanner unit 213 and execute reading of a plurality of originals set on the scanner unit 213 in cooperation with the scanner image processing unit 212. Upon completing scanning up to the last original set on the scanner unit 213, the scanner unit 213 notifies the control unit 201 of the end of scanning. With this operation, the control unit 201 detects the completion of the scanning operation in step S5, and the process advances to step S6.

In step S6, the control unit 201 determines whether the user has pressed the division designation button 803 in FIG. 7B to issue an instruction to perform divisional scanning. If divisional scanning has not been designated, the process advances to step S7 to create a transmission document by converting the read electronic data into a designated format by using the document format conversion application 311. The process then advances to step S8 to transmit, when, for example, transmission by electronic mail is designated, the document by electronic mail to the mail server 131.

If the control unit 201 determines in step S6 that divisional scanning is designated, the process advances to step S9 to create a transmission document by converting the read electronic data into a designated format by using the document format conversion application 311. The transmission document created in this case contains no end information of the transmission document unlike the transmission document created in step S7. A mail header necessary for transmission and information (Content-Type: message/partial) indicating that the mail is divided into a plurality of parts is added to this transmission document. The mail header includes transmission information such as a transmission destination and a message ID. The process then advances to step S10 to create information (divisional information) necessary for the creation of a divisional transmission document including the 51st to 100th pages which another image reading apparatus (the image reading apparatus 121 in this case) reads. The process advances to step S8 to transmit the transmission document created in step S9 to the mail server 131 (first transmission).

This divisional information includes a message ID, the offset information of the transmission document (electronic mail data to be divided), and fractional information used when MIME encoding is performed at the time of conversion into an electronic mail format. In this case, the message ID is information necessary for the mail reader in FIG. 8B (to be described later) to determine that divisional mail data are a series of mail data which can be combined. The offset information of the transmission document is the offset information of each page from the first to 50th pages generated by the document format conversion application 311. In addition, the fractional information at the time of MIME encoding specifies the number of characters of one line in MIME encoding. This is data used to input data whose number of characters is less than the specified number of characters as the first information of the second half transmission document created by the image reading apparatus 121. This fractional information is sufficiently smaller in size than the image data collected by one image reading apparatus when the image data read by a plurality of image reading apparatuses are collected and combined in one apparatus. The information therefore has almost no influence on the load on the network 151.

The above processing can implement mail transmission of the electronic data (image data) of the originals from the first to 50th pages of the first original bundle read by the image reading apparatus 111.

Figure 5:
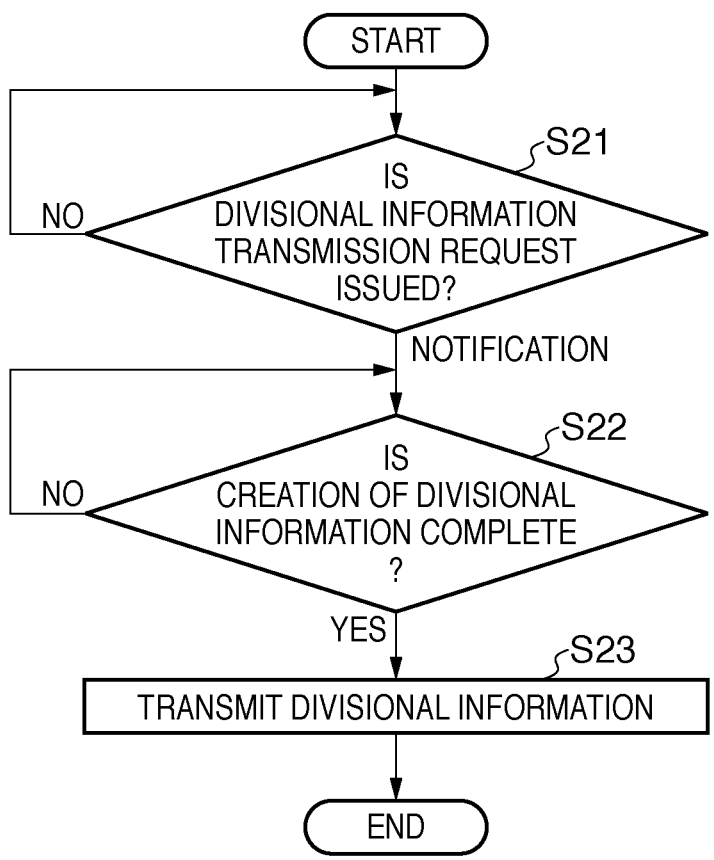
FIG. 5 is a flowchart for explaining the processing performed by a divisional information transmission application in each image reading apparatus.

FIG. 5 is a flowchart for explaining the processing performed by the divisional information transmission application 313 which executes divisional scanning using each image reading apparatus according to this embodiment. In the first embodiment, the image reading apparatus 111 executes this processing.

First of all, in step S21, the process waits for a request to transmit divisional information from the divisional scanning transmission application 315 of the image reading apparatus 121 which performs divisional scanning of the second original bundle starting from the 51st page to the 100th page. Upon receiving this divisional information transmission request, the process advances to step S22 to wait until the scanning transmission application 312 completes the creation processing of divisional information from the first page to the 50th page in the image reading apparatus 111 (step S10 in FIG. 4). When completing the creation processing of the divisional information in step S10, the process advances to step S23 to transmit the created divisional information to the image reading apparatus 121.

This makes it possible to notify the second image reading apparatus 121 which reads the 51st to 100th pages of the second original bundle of the divisional information of the originals including the first to 50th pages of the first original bundle read by the image reading apparatus 111.

Figure 6:
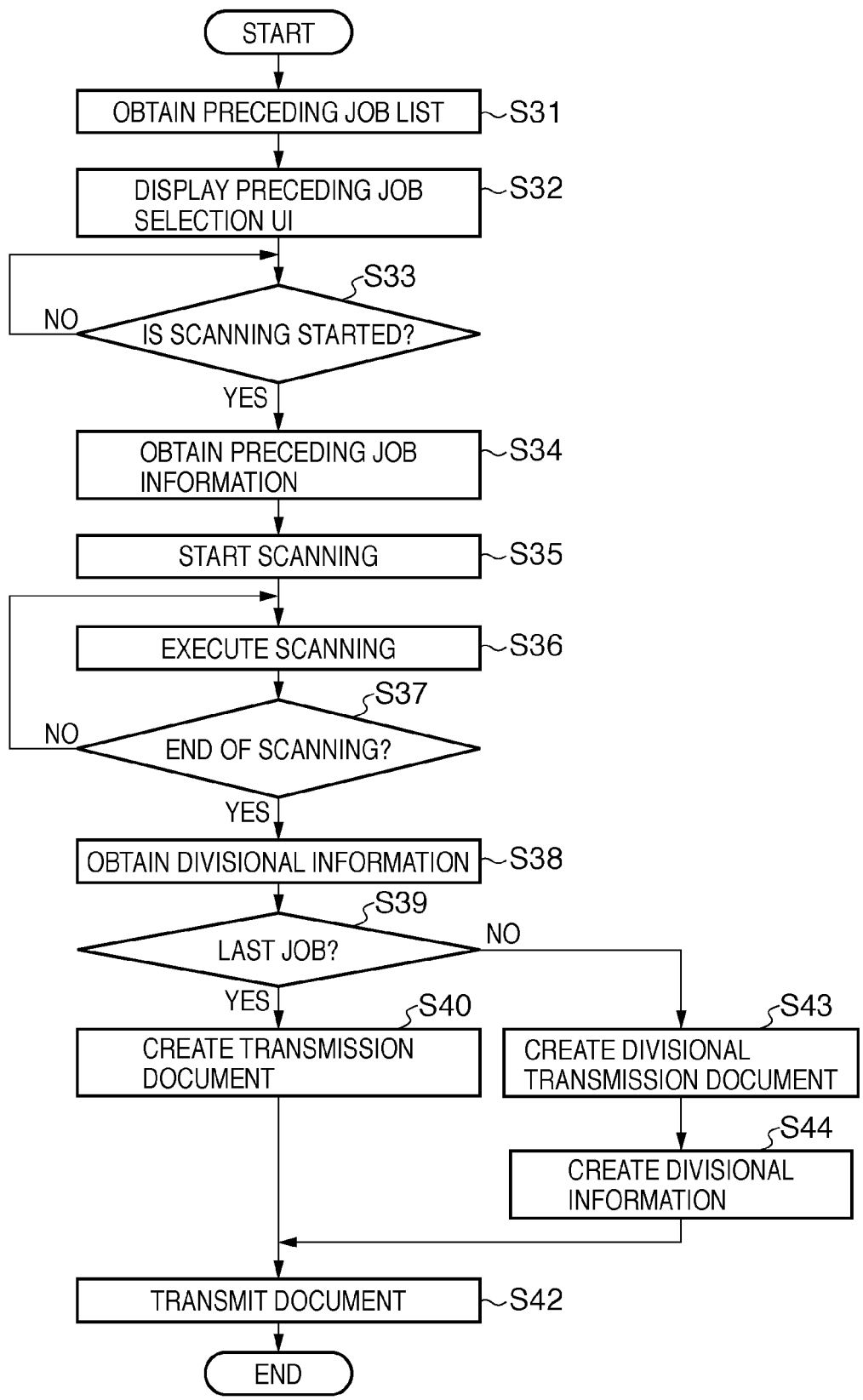
FIG. 6 is a flowchart for explaining processing in the second image reading apparatus when each image reading apparatus according to the first embodiment executes divisional scanning.

FIG. 6 is a flowchart for explaining processing in the second image reading apparatus when each image reading apparatus according to the first embodiment executes divisional scanning. Note that a program for executing this processing is loaded from the memory 208 into the RAM 203 at the time of execution, and is executed under the control of the CPU 202. In this case, this processing corresponds to processing performed by the image reading apparatus 121.

First of all, in step S31, the CPU 202 obtains a job list for divisional scanning from the divisional job list management application 314 of the image reading apparatus 111 with which the image reading apparatus 121 operates in cooperation. The obtained job list includes the date and time of each divisional scanning, a transmission destination of each divisional scanning, and a name of an image reading apparatus performing each divisional scanning. The process then advances to step S32 to display, for example, the UI screen shown in FIG. 8A on the operation unit 205.

FIG. 8A is a view showing an example of a UI screen displayed on the display unit of the operation unit 205 after the button 702 for addition to an existing scanning job is pressed on the UI screen in FIG. 7A.

A divisional scanning job list 901 indicates the preceding job list obtained in step S31. A selected job 902 highlighted in the divisional scanning job list 901 indicates an existing job which is selected by the user and subjected to be added. A last job button 903 is designated when scanning processing of the 51st to 100th pages which is to be executed is for the last bundle. In the first embodiment, since the processing is for the last bundle, the last job button 903 is highlighted, which indicates that the button is designated. A scan start button 904 is a button for issuing an instruction to start scanning the second original bundle in the image reading apparatus 121.

In step S32, the CPU 202 makes the settings shown in FIG. 8A in step S32. If the scan start button 904 is pressed in step S33, the process advances to step S34. In step S34, the divisional job list management application 314 of the image reading apparatus 111 obtains job information such as the scanning/reading settings for a preceding job, the detailed settings for the preceding job and the like from the divisional job list management application 314. The process then advances to step S35 to start scanning operation based on the job information. In step S36, the CPU 202 receives the image data from the scanner unit 213 and reads the original from the 50th page to the 100th page in cooperation with the scanner image processing unit 212. In step S37, upon completing scanning up to the last page, the scanner unit 213 notifies the control unit 201 of the end of scanning. When the control unit 201 determines the completion of the scanning operation, the process advances to step S38.

In step S38, the CPU 202 obtains the divisional information by issuing a request to the divisional information transmission application 313 of the image reading apparatus 111. The process then advances to step S39 to determine, based on the state of the last job button 903 in FIG. 8A, which is obtained in step S32, whether the last job is designated. If the CPU 202 determined that the last job is designated, the process advances to step S40; otherwise, the process advances to step S43. Upon determining that the last job is designated, the CPU 202 creates, in step S40, a transmission document by converting the format of the image data read in step S36 by using the document format conversion application 311 based on the divisional information obtained in step S38. That is, the CPU 202 creates a mail header including transmission information similar to that of the preceding mail and a message ID, and adds the mail header and information (Content-type: message/partial) indicating that the mail is divided into a plurality of parts and the like to the transmission document. The CPU 202 then converts the document into a succeeding electronic mail format that allows combining at the transmission destination by using the offset information of the received transmission document and fractional information at the time of MIME encoding. The process advances to step S42 to transmit the document to the mail server 131 (second transmission).

If the CPU 202 determines in step S39 that the last job is not designated and, for example, the third image reading apparatus is to successively scan the 101st and subsequent pages, the process advances to step S43. In step S43, the CPU 202 creates a transmission document based on the divisional information obtained in step S38 by using the document format conversion application 311. The transmission document created in this case is a transmission document containing no end information of the transmission document, unlike the transmission document created in step S40, as in step S9 performed by the image reading apparatus 111. The process then advances to step S44 to create divisional information as in step S10 in FIG. 4. More specifically, the CPU 202 creates divisional information necessary for the creation of a divisional transmission document required by the third image reading apparatus which reads the 101st and subsequent pages. The process advances to step S42 to transmit the transmission document to the mail server 131 based on the job information obtained in step S34.

In the above manner, it is possible to implement mail transmission of the image data read by the image reading apparatus 121, which includes, for example, the 51st to 100th pages.

With the above processing, the mail server 131 stores the transmission document from the first to 50th pages transmitted from the image reading apparatus 111 in step S10 and the transmission document from the 51st to 100th pages transmitted from the image reading apparatus 121 in step S44.

FIG. 8B is a view showing an example of a screen displayed on the display unit of the PC client 141 according to the first embodiment.

In this case, FIG. 8B shows an example of a screen of a mail reader when the transmission document stored in the mail server 131 is obtained by POP or the like. Reference numeral 1011 denotes a transmission document including the first to 50th pages scanned and transmitted by the image reading apparatus 111; and 1012, a transmission document including the 51st to 100th pages scanned and transmitted by the image reading apparatus 121. In this case, it is possible to combine the transmission documents 1011 and 1012 by using a combining function for mail divided into a plurality of parts and transmitted, which a general mail reader has. More specifically, when, for example, the user designates a pop-up message 1013 "divided mail data will be combined" in FIG. 8B, the transmission documents 1011 and 1012 are combined into one document. This combining operation conforms to RFC2046 or the like.

FIG. 9A is a view showing an example of a screen displaying a transmission document 1111 combined by the PC client 141 in this manner.

The mail text display in FIG. 8B is standard MIME-ENCODE display as a mail attachment format, as denoted by reference numeral 1014. However, combining these documents allows an application to convert the document into a file format (PDF) which can be referred to, like an attachment file 1112 in FIG. 9A. This makes it possible to browse the document.

As described above, it is possible to provide divisional scanning which reduces the traffic of the network and the load on one image reading apparatus.

In addition, if the size of mail to be transmitted exceeds the size of mail that can be transmitted once in document transmission in step S8 in FIG. 4 and document transmission in step S42 in FIG. 6, it is possible to divide the mail according to the predetermined size set in the image reading apparatuses 111 and 121 and make each image reading apparatus transmit the divided mail. Assume that the size of the transmission documents 1011 and 1012 in FIG. 8B is about twice a threshold (predetermined amount) for the specified size of a transmission document.

In this case, upon receiving the transmission documents, the mail reader of the PC client 141 divides the transmission document 1011 from the image reading apparatus 111 into two documents 1201 and 1202, as shown in FIG. 9B. The mail reader also divides the transmission document 1012 from the image reading apparatus 121 into two documents 1203 and 1204. FIG. 9B is a view showing an example of display of a screen when the PC client 141 according to the first embodiment divides each transmission document such that the size of each transmission document falls within a specified value.

If user wants to have transmission sources of the transmission documents transmitted by each image reading apparatus identical, the divisional information may include the transmission sources of the transmission documents. In this case, the image reading apparatus uses the transmission sources included in the divisional information as the transmission sources of the transmission documents.

According to the first embodiment, in addition, since the standard mail combining function of the mail reader is used to combine documents, there is no need to use any special application on the PC.

Although each image reading apparatus suffers from a limitation on the capacity of data that can be scanned due to a limitation on HDD capacity, since each image reading apparatus does not combine image data, each apparatus can scan a document which exceeds the upper limit of the number of pages that can be handled by one apparatus.

Second Embodiment

The second embodiment of the present invention will be described below with reference to the accompanying drawings.

Figure 10:
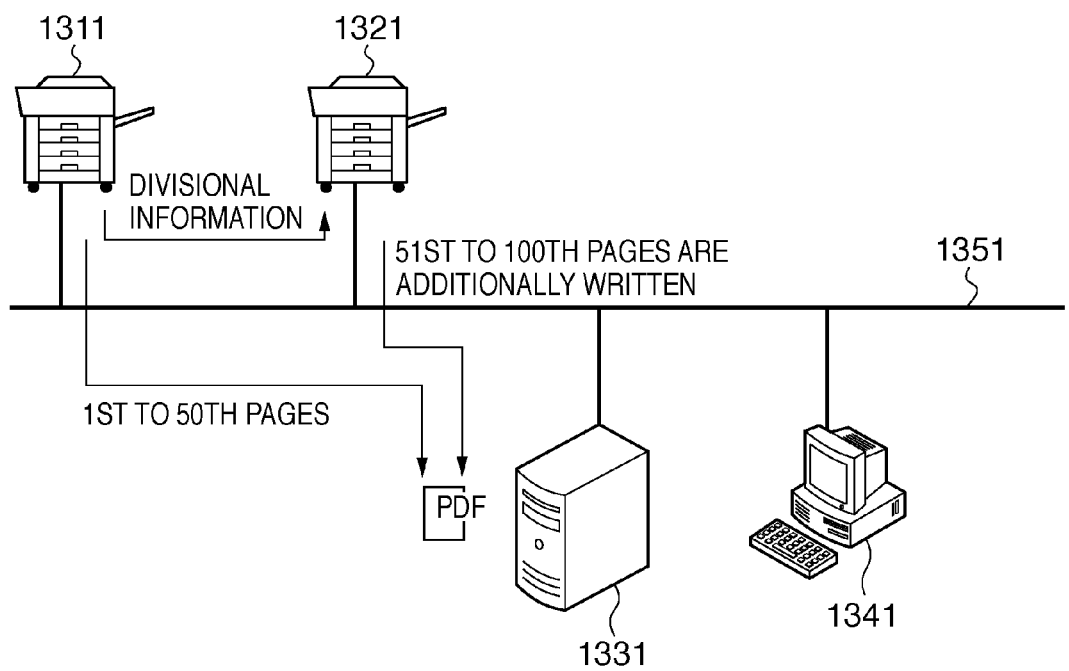
FIG. 10 is a view showing the arrangement of an image processing system according to the second embodiment.

FIG. 10 is a view showing the arrangement of an image processing system according to the second embodiment of the present invention.

Each of image reading apparatuses 1311 and 1321 includes a scanner unit and can read an original image. Each apparatus is an image reading apparatus having a function of performing divisional scanning and SMB transmission in accordance with instructions from the user. The arrangement of the image reading apparatuses 1311 and 1321 and a PC client 1341 according to the second embodiment is the same as that of the image reading apparatuses 111 and 121 and PC client 141 according to the first embodiment described above. Since the software arrangement of the image reading apparatuses 1311 and 1321 according to the second embodiment is the same as that shown in FIG. 3 in the first embodiment described above, a description will not be repeated.

In the second embodiment as well, the image reading apparatuses 1311 and 1321 perform divisional scanning upon grouping 100 original pages into two bundles each including 50 pages. The image reading apparatus 1311 scans and reads the first to 50th pages of the original subjected to divisional scanning. The image reading apparatus 1321 reads the second half original group from the 51st page to the 100th page. A file server 1331 receives and holds data transmitted from the image reading apparatuses 1311 and 1321 by SMB transmission. The file server 1331 transmits a held file to the PC client 1341 upon file operation by SMB from the PC client 1341. The PC client 1341 performs file operation for data from the file server 1331 by SMB. A network 1351 is a network which connects the image reading apparatuses 1311 and 1321, the file server 1331, and the PC client 1341 to each other. This network implements LAN connection such as ETHERNET®.

Divisional scanning according to the second embodiment of the present invention will be described next.

Figure 11:
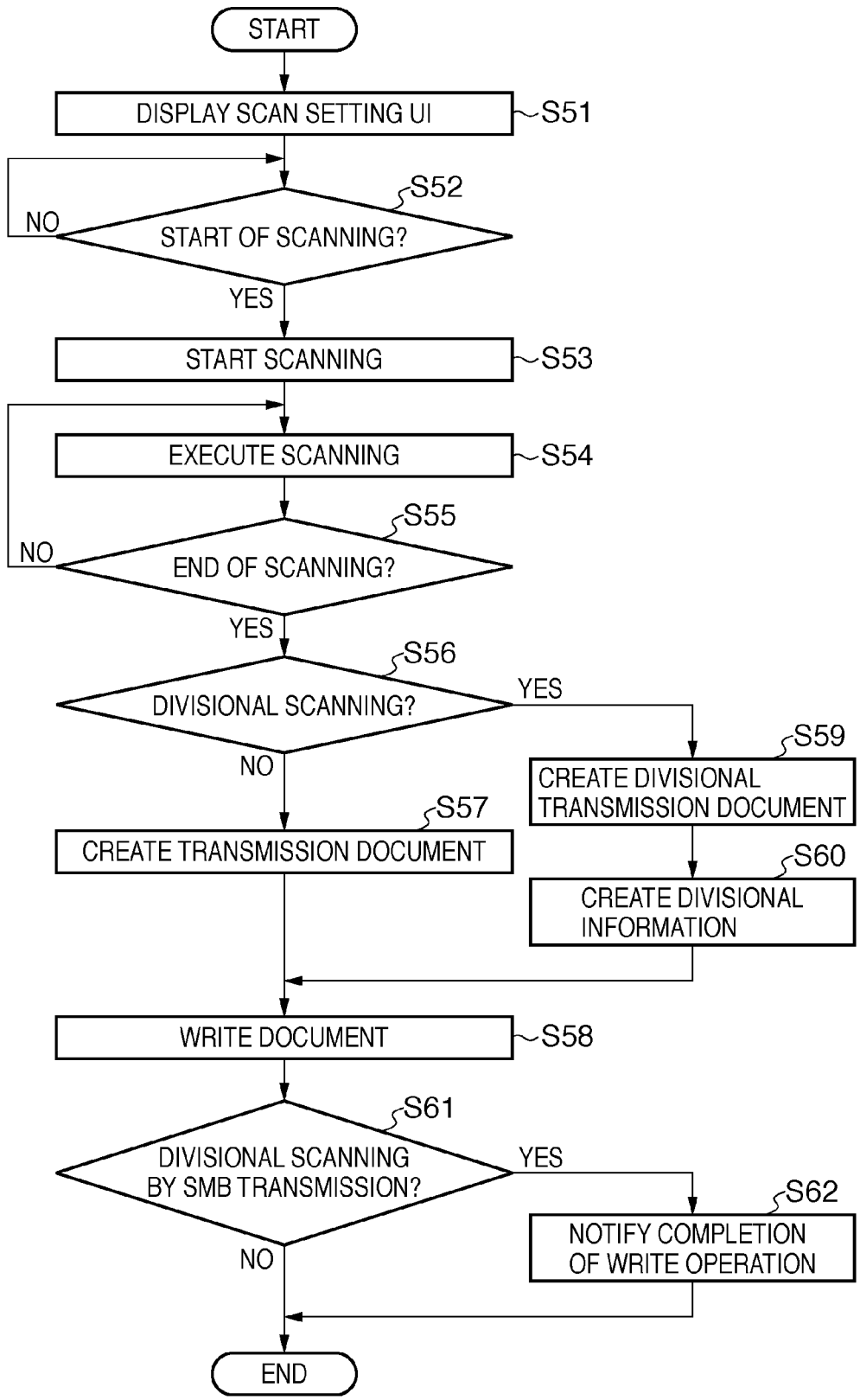
FIG. 11 is a flowchart for explaining divisional scanning processing in an image reading apparatus according to the second embodiment.

FIG. 11 is a flowchart for explaining the processing to be performed when each image reading apparatus according to the second embodiment executes divisional scanning. Note that a program for executing this processing is loaded from a memory 208 into a RAM 203 at the time of execution, and is executed under the control of a CPU 202. In this case, this processing corresponds to the processing performed by the image reading apparatus 1321. The processing in steps S51 to S57 and steps S59 and S60 in FIG. 11 is the same as that in steps S1 to S7 and steps S9 and S10 in FIG. 4, and hence a description will not be repeated.

In step S58, the CPU 202 writes the file created in step S57 or S59 in the file server 1331 based on information set by the user in step S51. The process then advances to step S61 to determine whether divisional scanning by SMB transmission is to be performed. If the CPU 202 determines that divisional scanning by SMB is to be performed, the process advances to step S62; otherwise, the CPU 202 terminates this processing. In step S62, since divisional scanning by SMB transmission is to be performed, the CPU 202 notifies the second image reading apparatus 1321 of the completion of the write operation, and terminates this processing.

The processing performed by a divisional information transmission application 313 of the first apparatus when the image reading apparatus 1311 according to the second embodiment executes divisional scanning is the same as that indicated by the flowchart in FIG. 5 in the first embodiment described above, and hence a description will not be repeated.

Figure 12:
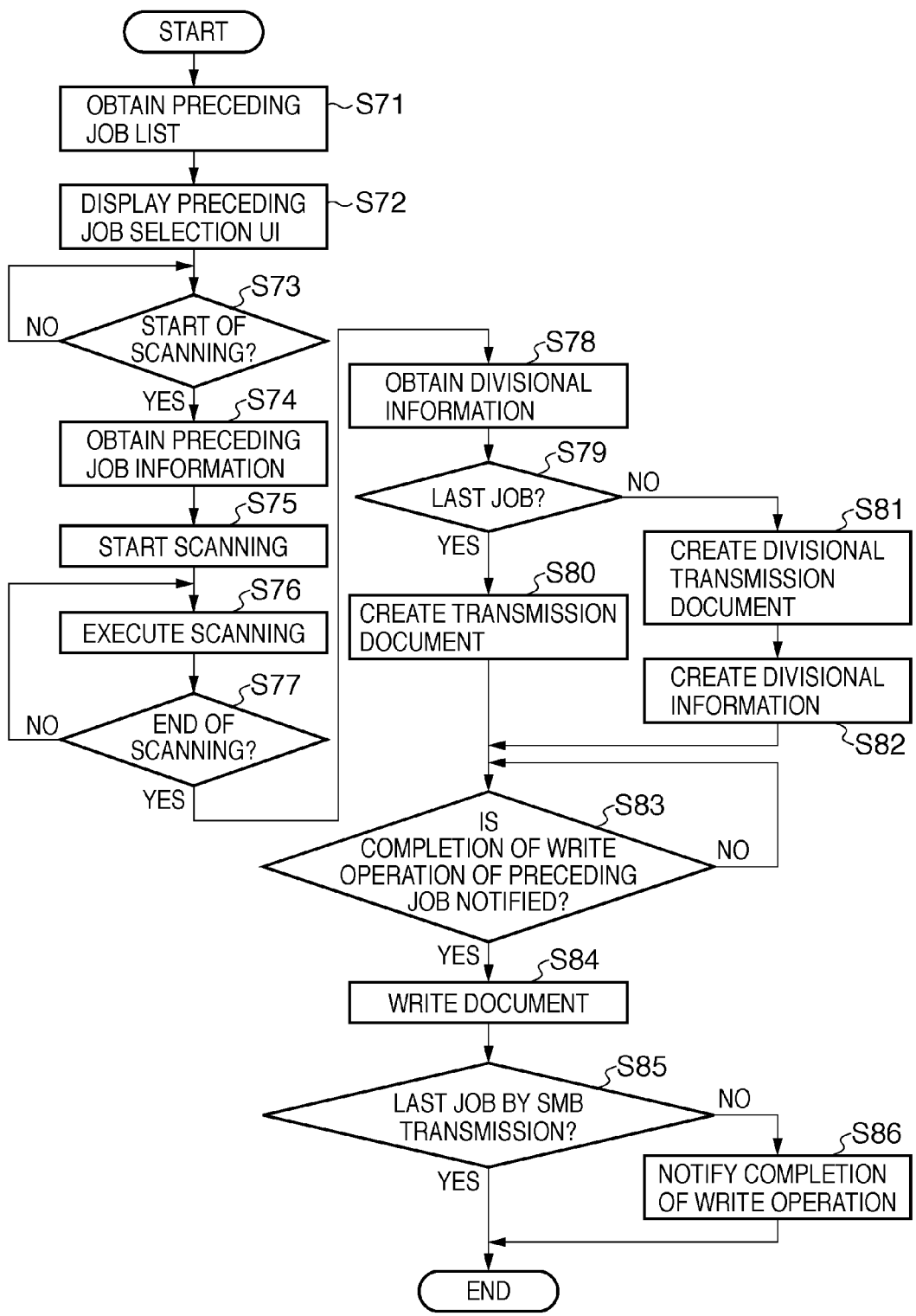
FIG. 12 is a flowchart for explaining processing in the second image reading apparatus when each image reading apparatus according to the second embodiment executes divisional scanning.

FIG. 12 is a flowchart for explaining the processing to be performed by the second image reading apparatus when each image reading apparatus according to the second embodiment of the present invention executes divisional scanning. Note that a program for executing this processing is loaded from the memory 208 into the RAM 203 at the time of execution, and is executed under the control of the CPU 202. In this case, this processing corresponds to the processing performed by the image reading apparatus 1321. Note that the processing in steps S71 to S82 in FIG. 12 is the same as that in steps S31 to S40 and steps S43 and S44 in FIG. 6 in the first embodiment described above, and hence a description will not be repeated.

In step S83, the CPU 202 determines whether it has received a write completion notification made by the scanning transmission application 312 of the image reading apparatus 1311 in step S62. If the CPU 202 determines that it has received a write completion notification, the process advances to step S84. This operation is performed because if the CPU 202 writes the information of the 51st and subsequent pages before the completion of writing of the first to 50th pages, the resultant file becomes inconsistent. In step S84, the CPU 202 additionally writes the file created in step S80 or S81 in the file server 1331. The process advances to step S85 to determine whether the current job is the last job in divisional scanning by SMB. If the CPU 202 determines that the current job is not the last job in divisional scanning by SMB, the process advances to step S86; otherwise, the CPU 202 terminates this processing. In step S86, the CPU 202 notifies the image reading apparatus, which is to read the 101st and subsequent pages, that the preceding document data have been completely written, and terminates the processing.

Consider here that the user has operated a transmission destination setting button 806 on the UI screen in FIG. 7B to select a mode other than "mail" which performs divisional transmission using divisional information at the time of divisional scanning and file transmission by SMB. This is, for example, the case in which the user has designated FAX transmission. In this case, a control unit 201 may instruct an operation unit 205 to invalidate a division designation button 803.

As described above, the second embodiment can provide divisional scanning which reduces the traffic of the network or the load on one image reading apparatus like the first embodiment described above.

The second embodiment uses the standard mail combining function of the mail reader to combine documents, and hence need not use any special application on the PC.

Although each image reading apparatus suffers from a limitation on the capacity of data that can be scanned due to a limitation on HDD capacity, since each image reading apparatus does not combine image data, each apparatus can scan a document which exceeds the upper limit of the number of pages that can be handled by one apparatus.

Third Embodiment

The third embodiment of the present invention will be described below with reference to the accompanying drawings.

Figure 13:
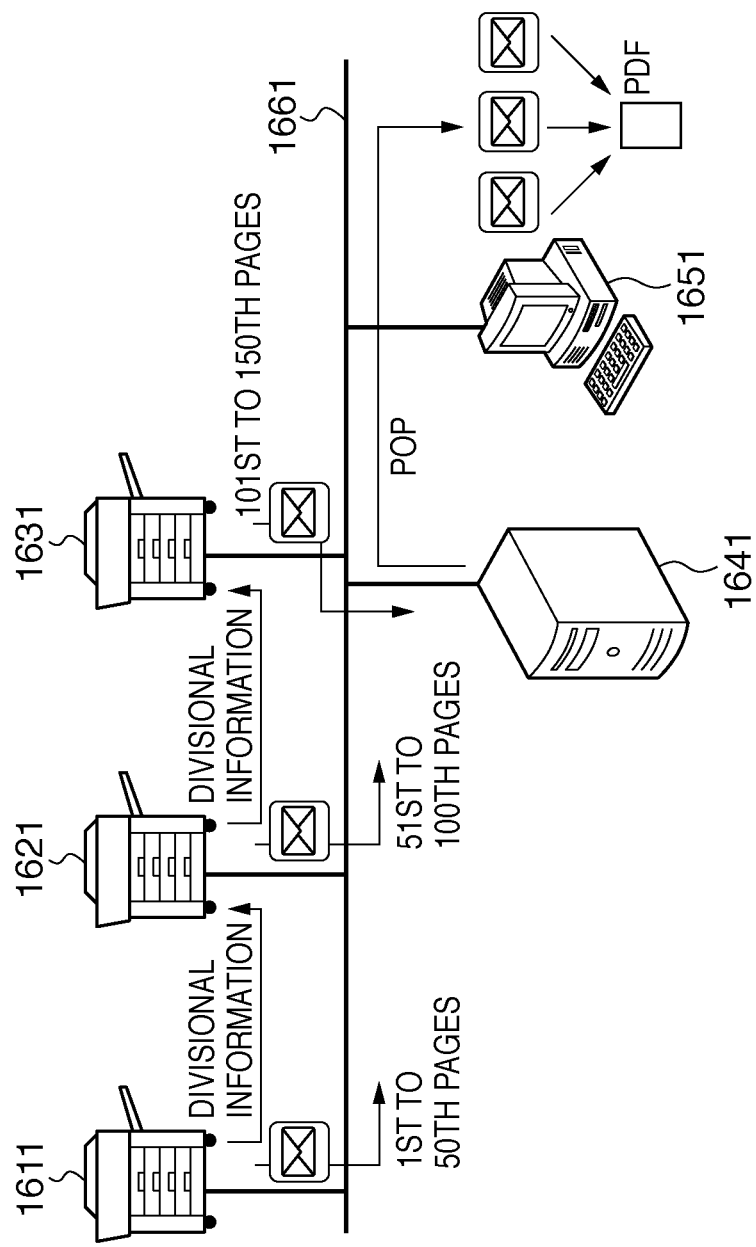
FIG. 13 is a view showing the arrangement of an image processing system according to the third embodiment.

FIG. 13 is a view showing the arrangement of an image processing system according to the third embodiment of the present invention.

Each of image reading apparatuses 1611, 1621, and 1631 includes a scanner unit and can read an original image. Each image reading apparatus also has a function of performing divisional scanning and mail transmission in accordance with instructions from the user. In this case, the image reading apparatuses 1611, 1621, and 1631 perform divisional scanning upon grouping an original of 150 pages into three bundles each including 50 pages. The image reading apparatus 1611 reads the first to 50th pages. The image reading apparatus 1621 reads the second bundle including the 51st to 100th pages. The image reading apparatus 1631 reads the 101st to 150th pages of the third bundle.

Note that the arrangement of the image reading apparatuses 1611, 1621, and 1631, a mail server 1641, and a PC client 1651 according to the third embodiment is the same as that of the image reading apparatuses 111 and 121, mail server 131, and PC client 141 according to the first embodiment described above. The software arrangement of the image reading apparatuses 1611 to 1631 according to the third embodiment is the same as that shown in FIG. 3 in the first embodiment described above, and hence a description will not be repeated.

The mail server 1641 receives and holds the electronic mail transmitted from the image reading apparatuses 1611, 1621, and 1631 as in the first embodiment described above. The mail server 1641 also has a function of transmitting, to the PC client 1651, held mail upon mail reading operation based on POP or the like by the PC client 1651. The PC client 1651 receives mail from the mail server 1641 by POP or the like. A network 1661 is a network which connects the image reading apparatuses 1611, 1621, and 1631, the mail server 1641, and the PC client 1651 to each other. This network implements LAN connection such as ETHERNET®.

The processing of executing divisional scanning by the image reading apparatuses 1611, 1621, and 1631 according to the third embodiment is the same as that shown in FIGS. 4 to 6 in the first embodiment described above, and hence a description will not be repeated.

Figure 14:
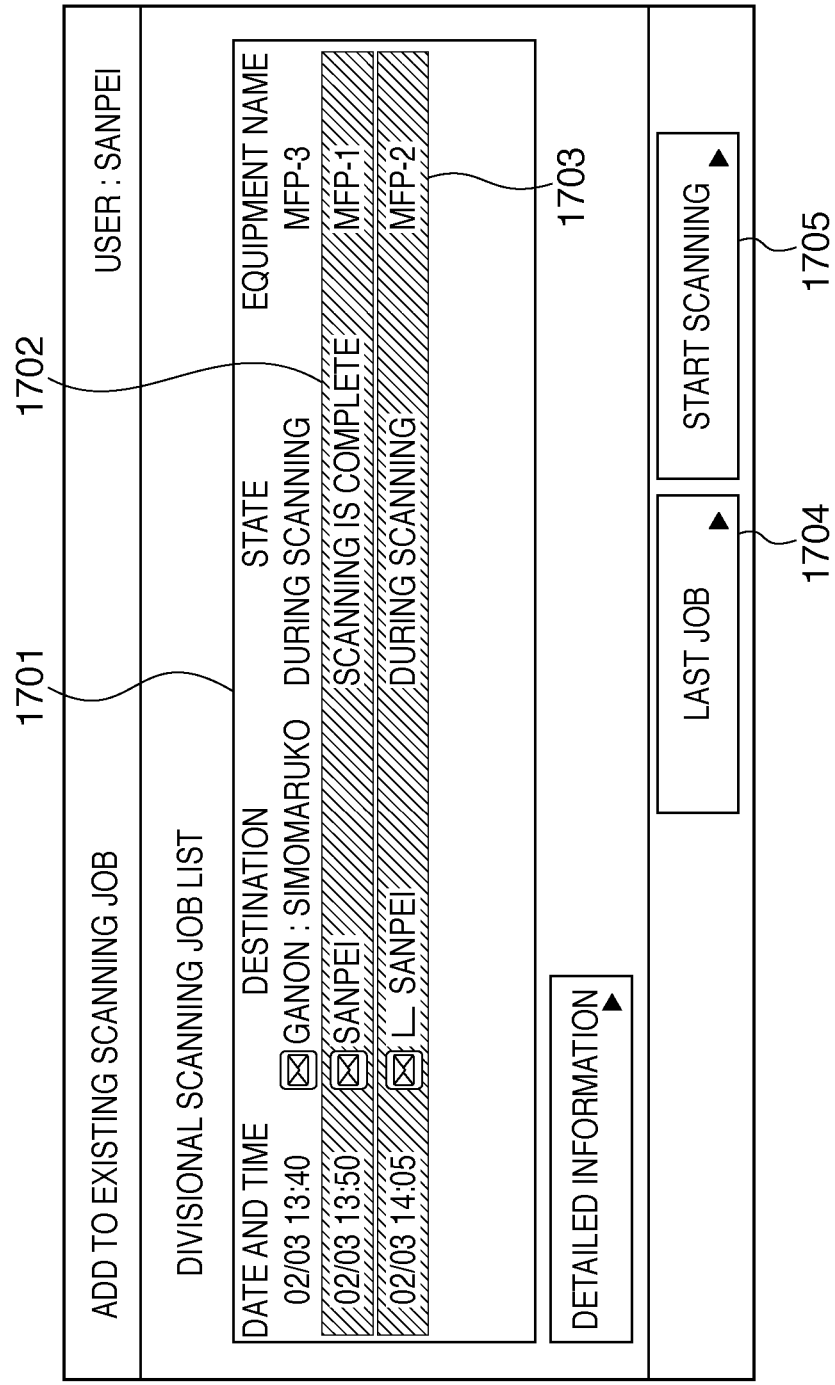
FIG. 14 is a view showing an example of a UI screen on the third image reading apparatus according to the third embodiment.

FIG. 14 is a view showing an example of a UI screen displayed on the third image reading apparatus 1631 when the third image reading apparatus reads an original of 150 pages and one of the image reading apparatuses 1611 and 1621 has already completed reading operation in the third embodiment.

In this case, FIG. 14 shows a UI screen for selecting a preceding job to read the 101st to the 150th pages by using the third image reading apparatus 1631.

A job 1702 indicates a transmission document which the first image reading apparatus 1611 has created by reading the original from the first page to the 50th page. Therefore, the scanning of this transmission document is complete. A job 1703 indicates that the second image reading apparatus 1621 is reading the original from the 51st page to the 100th page. In this case, the image reading apparatus 1621 is executing reading operation.

In this state, the user can issue an instruction to perform divisional scanning using the third image reading apparatus 1631 by designating a preceding scanning job.

That is, referring to FIG. 14, a divisional scanning job list 1701 indicates an acquired preceding job list. In the divisional scanning job list 1701, the selected jobs 1702 and 1703 highlighted indicate existing jobs selected by the user and subjected to be added. The user designates a last job button 1704 when scanning processing of the 101st to 150th pages which is to be performed from now on aims at the last bundle. In the third embodiment, since the processing aims at the last bundle, the last job button 1704 is highlighted to indicate that it is designated. A scan start button 1705 is a button for issuing an instruction to start scanning in the image reading apparatus 1631.

As described above, the third embodiment can provide divisional scanning which reduces the traffic of the network or the load on one image reading apparatus like the first embodiment.

In addition, the third embodiment uses the standard mail combining function of the mail reader to combine documents, and hence need not use any special application on the PC.

Although each image reading apparatus suffers from a limitation on the capacity of data that can be scanned due to a limitation on HDD capacity, since each image reading apparatus does not combine image data, each apparatus can scan a document which exceeds the upper limit of the number of pages that can be handled by one apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-060114, filed Mar. 12, 2009, which is hereby incorporated by reference herein in its entirety.

What is claimed is:

1. An image processing system comprising:
a plurality of image reading apparatuses including at least a first reading apparatus and a second image reading apparatus;
wherein the first image reading includes:
a first image reading unit configured to generate first image data by reading an image of a plurality of images to be combined;
a first converting unit configured to convert the first image data into a designated format;
a first transmission unit configured to transmit the first image data converted into the designated format to a transmission destination via a network; and
an information transmission unit configured to transmit, to the second image reading apparatus, information for allowing image data which is transmitted by the first image reading apparatus and the second image reading apparatus to be combined;
wherein said second image reading apparatus includes:
a second image reading unit configured to generate second image data by reading an image of the plurality of images to be combined,
a second converting unit configured to convert the second image data into the designated format, based on the information transmitted by the information transmission unit of the first image reading apparatus, to allow the transmission destination to combine the first image data and the second image data, and
a second transmission unit configured to transmit the second image data converted into the designated format to the transmission destination.

2. The system according to claim 1, wherein the first converting unit and the second converting unit each converts image data into an electronic mail format, and the first transmission unit and the second transmission unit each transmits the image data converted into the electronic mail format, based on an electronic mail protocol.

3. The system according to claim 2, wherein the information transmitted by the information transmission unit includes at least one of a message ID, offset information of the first image data transmitted by the first transmission unit, and fractional information of format conversion.

4. The system according to claim 2, wherein the first converting unit converts the first image data into an electronic mail format which includes no end information.

5. The system according to claim 4, wherein the second converting unit converts the second image data into an electronic mail format which includes end information.

6. The system according to claim 2, wherein:
the information transmitted by the information transmission unit is a message ID to determine that an electronic mail is one of a series of electronic mails to be combined;
the first converting unit converts the first image data into an electronic mail format which includes the message ID; and
the second converting unit converts the second image data into an electronic mail format which also includes the message ID.

7. The system according to claim 2, wherein:
the first converting unit converts the first image data into an electronic mail format to which information indicating that an electronic mail is divided into a plurality of parts is added; and
the second converting unit converts the second image data into an electronic mail format to which information indicating that an electronic mail is divided into a plurality of parts is also added.

8. The system according to claim 1, wherein the information transmitted by said information transmission unit is information indicating that the first image data is one of the plurality of images to be combined.

9. A method of controlling a plurality of image reading apparatuses which include at least a first image reading apparatus and a second image reading apparatus, the method comprising:
a first image reading step of causing the first image reading apparatus to generate first image data by reading an image of a plurality of images to be combined;
a first converting step of causing the first image reading apparatus to convert the first image data into a designated format;
a first transmission step of causing the first image reading apparatus to transmit the first image data converted into the designated format to a transmission destination;
an information transmission step of causing the first image reading apparatus to transmit, to the second image reading apparatus, information for allowing image data which is transmitted by the first image reading apparatus and the second image reading apparatus to be combined;
a second image reading step of causing the second image reading apparatus to generate second image data by reading an image of the plurality of images to be combined;
a second converting step of causing the second image reading apparatus to convert the second image data into the designated format, based on the information transmitted by the first image reading apparatus, to allow the transmission destination to combine the first image data and the second image data; and
a second transmission step of causing the second image reading apparatus to transmit the second image data converted into the designated format to the transmission destination.

10. The method according to claim 9, wherein in the first converting step and the second converting step, image data is converted into an electronic mail format, and in the first transmission step, the image data converted into the electronic mail format is transmitted based on an electronic mail protocol.

11. The method according to claim 10, wherein the transmitted information includes at least one of a message ID, offset information of the first image data transmitted in the first transmission step, and fractional information of format conversion.

12. The method according to claim 9, wherein the transmitted information is information indicating that the first image data is one of the plurality of images to be combined.

13. An image reading apparatus comprising:
a reception unit configured to receive information from another image reading apparatus, wherein the other image reading apparatus generates first image data by reading an image of a plurality of images to be combined, converts the first image data into a designated format, and transmits the first image data converted into the designated format to a transmission destination, and wherein the received information allows image data which is transmitted by the image reading apparatus and the other image reading apparatus to be combined;
an image reading unit configured to generate second image data by reading an image of the plurality of images to be combined;
a converting unit configured to convert the second image data into the designated format, based on the information received by the reception unit, to allow the transmission destination to combine the first image data and the second image data; and
a transmission unit configured to transmit the second image data converted into the designated format to the transmission destination.

14. The apparatus according to claim 13, wherein the information received by the reception unit is information indicating that the first image data is one of the plurality of images to be combined.

15. The apparatus according to claim 13, wherein:
the converting unit converts the second image data into an electronic mail format; and
the transmission unit transmits the second image data converted into the electronic mail format, based on an electronic mail protocol.

16. The apparatus according to claim 15, wherein:
the other image reading apparatus converts the first image data into an electronic mail format which includes no end information, and
the converting unit converts the second image data into an electronic mail format which includes end information.

17. The apparatus according to claim 15, wherein:
the information received by the reception unit is a message ID to determine that an electronic mail is one of a series of electronic mails to be combined; and
the converting unit converts the second image data into an electronic mail format which includes the message ID.

18. The apparatus according to claim 15, wherein the converting unit converts the second image data into an electronic mail format to which information indicating that an electronic mail is divided into a plurality of parts is added.

* * * * *